May 9, 1967

R. R. WEBSTER ET AL 3,319,065

SCINTILLATION DETECTOR COMPRISING A FLAT
ANNULAR SCINTILLATING CRYSTAL

Filed Nov. 29, 1963

INVENTORS
Richard R. Webster
Walter A. Wilson
BY their ATTORNEY

United States Patent Office 3,319,065
Patented May 9, 1967

3,319,065
SCINTILLATION DETECTOR COMPRISING A FLAT ANNULAR SCINTILLATING CRYSTAL
Richard R. Webster, Bethel Park, and Walter A. Wilson, Scott Township, Allegheny County, Pa., assignors to Jones & Laughlin Steel Corporation, Pittsburgh, Pa., a corporation of Pennsylvania
Filed Nov. 29, 1963, Ser. No. 327,148
5 Claims. (Cl. 250—71.5)

This invention relates to apparatus for irradiating material and detecting radiation therefrom, and is more particularly concerned with apparatus for detecting radiation heterogeneous in both energy and angular distribution.

Radiation in the form of X-rays, gamma-rays and beta rays is utilized in various ways to determine the properties of materials. In some of these applications, the radiation is directed onto the surface of the material which reflects it in greater or lesser degree. This reflected radiation is an index of the property which is desired to be ascertained and must, therefore be detected and measured. If the radiation to be detected is confined to a narrow beam, conventional detecting means are satisfactory. Prior to our invention to be described, however, there existed no apparatus well adapted to detect simultaneously radiation distributed over a substantial portion of the angular spectrum.

It is an object of our invention to provide apparatus adapted to irradiate material and to detect radiation therefrom distributed over the entire $2\pi$ solid angle or over any portion thereof. It is another object to provide such apparatus which simultaneously detects radiation so distributed. It is another object to provide such apparatus which integrates radiation so detected and produces a signal corresponding to substantially all that radiation. Other objects of our invention will appear in the course of the description thereof which follows.

An embodiment of our apparatus presently preferred by us is illustrated in the following figures to which reference is now made.

Figure 1:
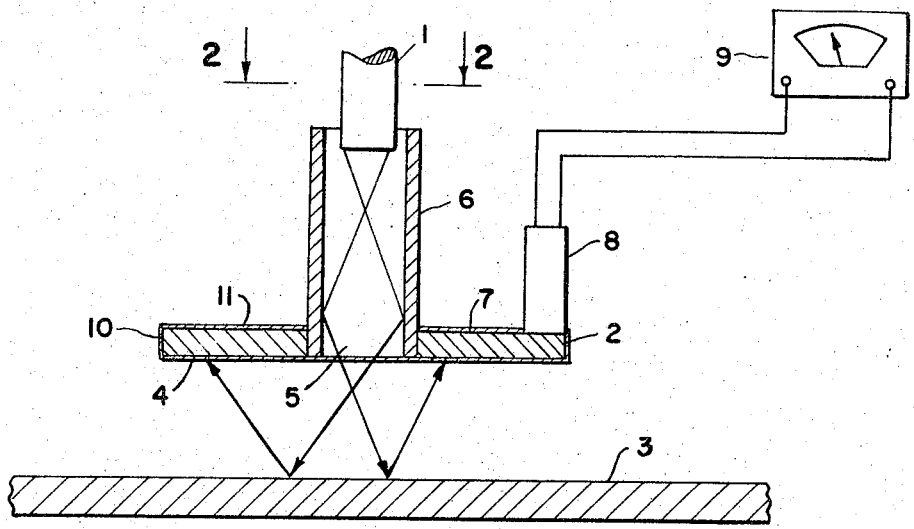
FIGURE 1 is a schematic elevation, partly in section, of the apparatus of our invention.
Figure 2:
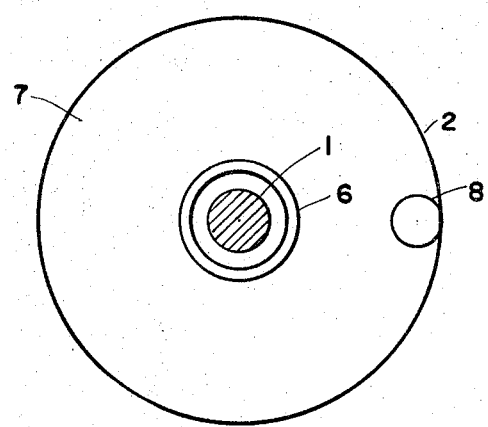
FIGURE 2 is a horizontal cross section of the apparatus of FIGURE 1, taken on the plane 2—2.

An X-ray tube 1 is mounted above a sample 3 to be irradiated. Intermediate the X-ray tube and the sample is positoned a scintillation crystal 2. Such crystals convert relatively short wave length radiation falling on them into light, as is well known. This crystal 2 is in the form of a flat disc and is positioned with one flat face 4 parallel and opposite to the sample 3. Crystal 2 is also provided with a central hole 5, and this hole is fitted with a tubular shield 6 which extends to the lower face 4 of crystal 2, and up from crystal 2 to the X-ray tube 1 so as to surround the beam of radiation from that tube and prevent any radiation therefrom falling on crystal 2. Adjacent the upper face 7 of crystal 2 is a photo-detector 8. A convenient photo-detector which we employ is a photo-cell which converts light into electric current, as is well known. Connected to photo-cell 8 is a current detector 9. Both upper face 7, lower face 4 and edge 10 of crystal 2, except for the area opposite photo-detector 8, are covered with a coating 11 which reflects internally of crystal 2 substantially all light generated in crystal 2 by impinging X-rays. Coating 11 is substantially transparent to X-rays.

The operation of our apparatus will be described with respect to the preferred embodiment thereof described and illustrated herein. X-rays from X-ray tube 1 travel down the inside of tubular shell 6 and impinge on sample 3. They are reflected from the sample against face 4 of crystal 2 as is shown diagrammatically in FIGURE 1. The scintillation crystal 2 converts those X-rays to light which is reflected internally of crystal 2 by light reflective coating 11 until it falls on photo-detector 8. The light falling on that detector is converted by it into electrical current which is indicated by current indicator 9.

The type of radiation is chosen with respect to the crystal structure of the sample to be irradiated. The material for coating 11 is chosen with respect to the wave lengths of the X-rays or other radiation which falls upon it and must be substantially transparent to that radiation. Shield 6 is made from a heavy metal such as tungsten or lead, which absorbs the X-rays or other radiation.

Scintillation crystal 2 is made from a substance which is fluorescent and which is substantially transparent to its own light energy. Examples of such substances are sodium iodide, potassium iodide, and caesium iodide. Other substances of like properties may also be employed.

We claim:

1. Apparatus for irradiating material comprising a source of radiation spaced from the material and adapted to direct a beam of radiation thereon, means for converting radiation to light positioned between the material and the source of radiation and having a face opposed to the material adapted to receive radiation reflected therefrom, radiation shield means extending from said source of radiation to said face and terminating at said face, said shield means surrounding the beam of radiation so as to prevent any radiation therefrom from falling on said converting means, photoelectric means adjacent the means for converting radiation to light adapted to receive light therefrom and convert it to electrical current, and a light-reflecting coating on the exterior of the means for converting radiation to light adapted to cause substantially all the light generated therein by radiation from the material to be reflected internally and fall on the photoelectric means.

2. Apparatus of claim 1 in which the means for converting radiation to light are extended parallel to the plane of the material and are provided with a hole through which the beam of radiation from the source of radiation passes.

3. Apparatus of claim 1 in which the means for converting radiation to light are annular in configuration.

4. Apparatus of claim 1 in which the means for converting radiation to light comprise a scintillation crystal.

5. Apparatus for irradiating material comprising a source of radiation spaced from the material and adapted to direct a beam of radiation thereon, a flat annular scintillation crystal positioned between the material and the source of radiation with one flat face opposed to the material and adapted to receive radiation reflected therefrom, radiation shield means extending from said face to said source of radiation in a manner so as to surround the beam of radiation and prevent any radiation therefrom from falling on said crystal, a photoelectric device adjacent to another surface of the crystal, a light reflecting coating covering the remaining exterior of the crystal, and electric current indicating means connected to the photoelectric device.

References Cited by the Examiner

UNITED STATES PATENTS

| | | | |
|---|---|---|---|
| 2,457,555 | 12/1948 | Haworth | 250—51.5 |
| 2,937,278 | 5/1960 | Copland | 250—51.5 |
| 3,011,060 | 11/1961 | Dorenbosch et al. | 250—51.5 X |
| 3,207,895 | 9/1965 | Schumacher | 250—71.5 X |

ARCHIE R. BORCHELT, *Primary Examiner.*